Patented June 23, 1942

2,287,102

UNITED STATES PATENT OFFICE 2,287,102

PREPARATION FOR PROMOTING THE GROWTH OF PLANTS

Otto Isler, Basel, Switzerland, assignor to Hoffmann-La Roche, Inc., Nutley, N. J., a corporation of New Jersey No Drawing. Application November 14, 1938, Serial No. 240,379. In Switzerland November 26, 1937

8 Claims. (Cl. 71—2)

It is known that various organic acids, for instance α- and β-naphthyl-acetic acid, allocinnamic acid, β-indolyl-acetic acid, β-indolyl-propionic acid, β-indolyl-butyric acid, phenyl-acetic acid, acenaphthyl-5-acetic acid and fluorene-acetic acid under suitable conditions stimulate the striking of roots from cuttings, the formation of adventitious roots and of shoots, and the growth of roots. These materials for promoting the growth of plants sometimes are used in aqueous solution into which the cuttings are dipped, sometimes in the form of a paste with wool fat, or else injected into the tissues in the form of an aqueous solution or introduced into the roots from the soil.

Furthermore, it is known (Contribution Boyce Thompson Inst. vol. 8, pages 105–112) that the methyl esters of the above indolyl-compounds are better suited for the creation of adventitious roots and are more active than the corresponding acids.

It has now been found that glycines of organic carboxylic acids are particularly suited as plant growth substances stimulating root formation.

Example 1

2 grams of α-naphthacetyl glycine ($C_{10}H_7CH_2CONHCH_2COOH$ shining needles melting at 152–153° C., prepared from α-naphthacetyl chloride and glycocoll) are dissolved in 82 cc. of $\frac{1}{10}$ n sodium hydroxide and diluted to 100 cc. Of this aqueous solution of the sodium salt of α-naphthacetyl glycine 10 cc. are added to at least one liter of tap water and the cuttings placed in this solution for 16–20 hours. The cuttings are then washed and planted. After being treated in this manner they give rise to a greater number of roots which show a considerably stronger growth; furthermore, the formation of the roots sets in much more quickly and in a greater percentage of the treated than of the untreated cuttings.

Example 2

Instead of the sodium salt of α-naphthacetyl glycine the potassium salt of phenacetyl glycine ($C_6H_5CH_2CONHCH_2COOK$) is used.

Example 3

From allocinnamyl glycine ($C_6H_5CH=CHCONHCH_2COOH$ colourless crystalline compound melting at 65–70° C., obtained by catalytic hydrogenation of phenyl-propiolyl glycine) a 2% solution of the sodium salt is prepared. One part of this solution is diluted with at least 100 parts of tap water. By dipping cuttings into this solution the formation of roots is facilitated.

Example 4

From indolylacetyl glycine ($C_8H_6N.CH_2.CO.NH.CH_2.COOH$)

a 2% solution of the sodium salt is prepared and treated in accordance with Example 3.

I claim:

1. A preparation in form for administration to plants for promoting the growth thereof comprising a carrier material having distributed therein a small proportion of active components consisting of a compound of the general formula $CH_2-CO-NH-CH_2COOX$

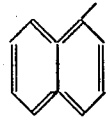

wherein X is selected from the group consisting of hydrogen and alkali metal.

2. A preparation in form for administration to plants for promoting the growth thereof comprising a carrier material having distributed therein a small proportion of active components consisting of α-naphthacetyl glycine.

3. A preparation in form for administration to plants for promoting the growth thereof comprising a carrier material having distributed therein a small proportion of active components consisting of a compound of the general formula $CH=CH-CO-NHCH_2COOX$

wherein X is selected from the group consisting of hydrogen and alkali metal.

4. A preparation in form for administration to plants for promoting the growth thereof comprising a carrier material having distributed therein a small proportion of active components consisting of allocinnamyl glycine.

5. A preparation in form for administration to plants for promoting the growth thereof comprising a carrier material having distributed therein a small proportion of active components consisting of a compound of the general formula

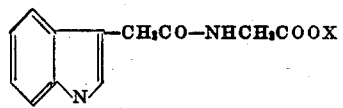

wherein X is selected from the group consisting of hydrogen and alkali metal.

6. A preparation in form for administration to plants for promoting the growth thereof comprising a carrier material having distributed therein a small proportion of active components consisting of indolylacetyl glycine.

7. A preparation in form for administration to plants for promoting the growth thereof comprising a carrier material having distributed therein a small proportion of active components consisting of compounds of the general formula:

R—NH—CH₂—COOX wherein R comprises a radical selected from the group consisting of α-naphthacetyl-, phenacetyl-, allocinnamyl-, and indolylacetyl-radicals, and X comprises a radical selected from the group consisting of hydrogen and alkali metal.

8. A process of promoting the growth of plants which comprises treating the plants with a material comprising a carrier material having distributed therein a small proportion of active components consisting of compounds of the general formula:

R—NH—CH₂—COOX wherein R comprises a radical selected from the group consisting of α-naphthacetyl-, phenacetyl-, allocinnamyl-, and indolylacetyl-radicals, and X comprises a radical selected from the group consisting of hydrogen and alkali metal.

OTTO ISLER.